Aug. 20, 1963 J. P. COSTAS 3,101,448

SYNCHRONOUS DETECTOR SYSTEM

Filed Dec. 23, 1954

INVENTOR:
JOHN P. COSTAS,

BY Julius J. Zaskalicky
HIS ATTORNEY.

United States Patent Office 3,101,448 Patented Aug. 20, 1963

3,101,448
SYNCHRONOUS DETECTOR SYSTEM

John P. Costas, Fayetteville, N.Y., assignor to General Electric Company, a corporation of New York Filed Dec. 23, 1954, Ser. No. 477,169
2 Claims. (Cl. 329—50)

Figure 1:
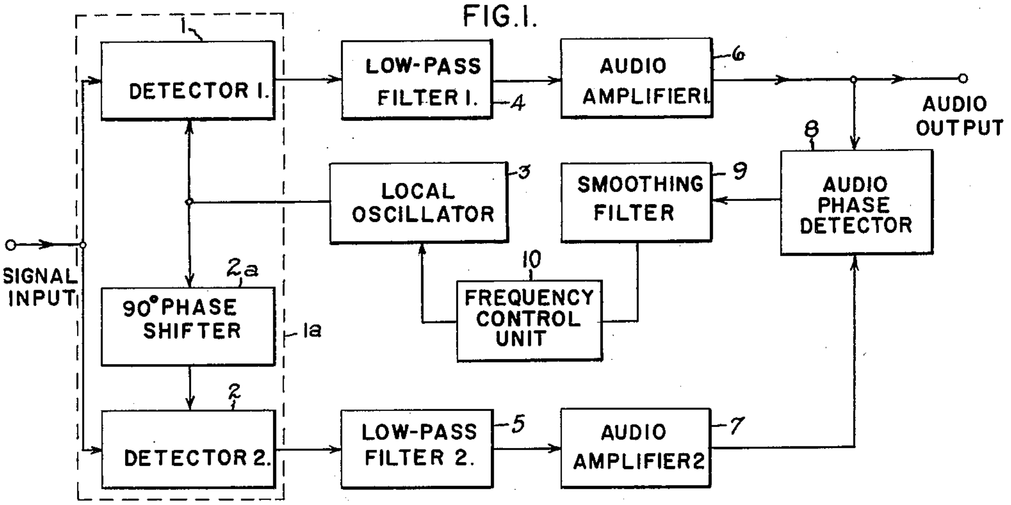

The present invention relates generally to communication systems and improvements therein and has as a particular object thereof to provide an improved mode of reception of amplitude modulated signals independent of the presence of a component of carrier frequency in the modulated signals.

Applicant's invention has particular application in amplitude modulation communication systems of the kind in which the carrier thereof is suppressed. Such systems, commonly called suppressed carrier or double sideband communication systems, have several advantages over other amplitude modulation communication systems. One such advantage is the elimination of the need for a carrier wave into which normally considerable power is expended. Another such advantage is the ease, simplicity, and effectiveness with which the necessary filtering is performed since it is done after detection and consequently is done at low frequencies. A further such advantage is the greater suppression of adjacent channel and other interference than can be achieved with conventional amplitude modulation systems. A still further such advantage is the capability of greater fidelity of communication that may be had than with conventional amplitude modulation systems.

In double sideband communication systems, the modulating intelligence is recovered by combining or heterodyning the sidebands of the received signal with a locally generated wave having the same frequency as the carrier and in phase therewith. Prior art systems have depended on the transmission of a small amount of carrier for the purpose of synchronizing the locally generated wave with the carrier wave. Such prior art systems require additional elements in the radio frequency and the audio frequency portions of the receiver which considerably complicate the receiving apparatus of the system. Also, such a system of synchronization is subject to the disadvantage of locking on spuriously received carriers. The present invention is directed to the provision of an improved system of amplitude modulation communication in which the foregoing and other disadvantages are eliminated.

Accordingly, another object of the present invention is to provide a simple and effective means in an amplitude modulation communication system for maintaining proper synchronization of a locally generated wave with the carrier of the system.

Still another object of the present invention is to provide in amplitude modulation systems carrier synchronization means functioning only on the sideband components of the amplitude modulation signal.

A further object of the present invention is to provide means independent of the carrier in the received amplitude modulation signal for maintaining a locally generated wave of carrier frequency in proper synchronism with the carrier.

A still further object of the present invention is to provide a simple yet highly effective double sideband demodulation means.

In carrying out the present invention as applied in one form in apparatus for the reception of double sideband modulation signals there is provided a means for combining said signals with a locally generated wave of carrier frequency to derive another wave corresponding to the modulating component of the received signal. The other wave has one phase when the departure in phase of the locally generated wave from the phase of the carrier of the received signal is in one direction and has the opposite phase when the departure is in the other direction. Means are also provided responsive to the phase of said other wave for maintaining the phase of the locally generated wave in correspondence with the phase of the carrier.

Figure 2:
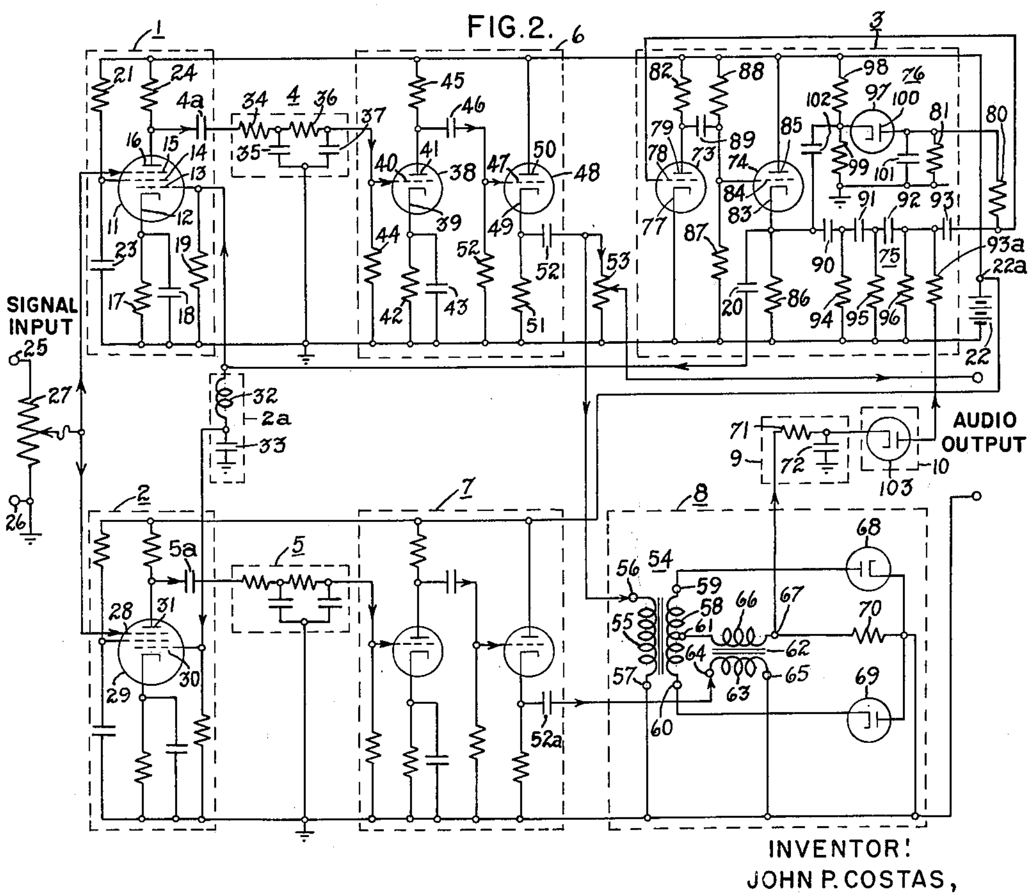

The novel features which are believed to be characteristic of this invention are set forth with particularity in the appended claims. The invention itself, however, both as to its organization and method of operation together with further objects and advantages thereof may best be understood when taken in connection with the accompanying drawings in which:

FIG. 1 is a block diagram of a portion of a system embodying the present invention, and FIG. 2 represents one schematic form of the block diagram of FIG. 1.

In a double sideband system of communication, a carrier wave is modulated in amplitude by another wave, the components of carrier frequency are suppressed, and the remaining sidebands, two in number, are transmitted. At the receiving end the double sideband wave is demodulated by heterodyning the double sideband wave with a wave having the same frequency as the carrier frequency and in phase therewith. It is essential that the locally generated wave be accurately controlled in frequency and phase for recovery of the modulating wave.

Referring now to the illustrative embodiment of FIG. 1, there is shown apparatus for the reception and demodulation of such double sideband signals comprising a pair of detectors 1 and 2, a local oscillator 3, a phase shifter 2*a*, a pair of low pass filters 4 and 5, a pair of audio amplifiers 6 and 7, an audio phase detector 8, a smoothing filter 9, and a frequency control unit 10.

Detectors 1 and 2 may be synchronous detectors for developing an output which includes a mathematical product of the signals applied to a pair of inputs thereof. For example, they may comprise a frequency converter circuit of the kind commonly used in radio receivers for converting radio frequency signals into intermediate frequency signals.

Local oscillator 3 functions to develop a wave of carrier frequency. The local oscillator 3 may be a conventional radio frequency oscillator whose frequency is controlled by a reactance which, in turn, is controlled by suitable unidirectional potentials applied thereto. The local oscillator may also be a phase shift type of oscillator and the frequency control element thereof may include a means for varying the phase shift of the feedback of the oscillator thereby changing its frequency.

The output from local oscillator 3 and the double sideband signal to be demodulated are applied to the detector 1 at the output of which is derived a wave corresponding to the modulating wave and a component of twice the frequency of the original carrier wave modulated by said modulating wave. The modulating wave is recovered by filtering. The output of the local oscillator 3 is shifted in phase by 90 degrees and also applied to the detector 2 along with a double sideband signal. At the output of the detector 2 is obtained a wave having frequency components similar to the frequency components at the output of the detector 1. This output includes a wave representing the modulating wave and another wave of twice carrier frequency modulated by the modulating wave. However, the amplitude and phase of the modulating wave at the output of detector 2 may be different from the amplitude and phase of the modulating wave at the output of detector 1 by a factor which is a function of the magnitude and direction of departure of the phase of the locally generated carrier wave with respect to the carrier wave as it would have been received had it been transmitted.

The outputs of the detectors 1 and 2 are applied respectively to low pass filters 4 and 5 respectively. These filters remove the components of twice carrier frequency and allow waves of modulating frequency to pass to the output thereof. The modulating waves obtained at the output of filters 4 and 5 are amplified respectively by audio amplifiers 6 and 7 after which they are applied to an audio phase detector 8.

The audio phase detector 8 may be any of a variety of detectors for deriving a signal having one polarity when the waves applied thereto are in phase and another polarity when the waves applied to the input thereof are out of phase one with respect to one another and developing an amplitude depending upon the relative magnitudes of the two waves. Thus, at the output of the audio phase detector is obtained a voltage whose polarity and magnitude varies in accordance with the direction and magnitude of departure of the phase of the wave from the local oscillator 3 with respect to the phase of the carrier wave of the transmitted double sideband signal.

The smoothing filter 9 separates the unidirectional component from the alternating components at the output of the phase detector. The output from the smoothing filter is applied to a frequency control unit 10 which, in turn, is arranged to cause a change in the frequency of the local oscillator to maintain the output of the local oscillator in phase with the carrier wave. Thus, it is seen that by means of the system of FIG. 1 not only is the modulating voltage recovered at the output of audio amplifier 6, but also, this channel in conjunction with another channel is utilized for the purpose of maintaining the local oscillator 3 in synchronism with the carrier wave to obtain the desired modulating wave without need for any transmitted carrier.

The operation of block diagram of FIG. 1 will become clear by consideration of an example. Let the double sideband carrier amplitude modulation signal be represented by the equation $$V_1 = f_m(t)\ \cos\ \omega_0 t \quad (1)$$

Let the output of local oscillator 3 be represented by the equation $$V_2 = \cos\ (\omega_0 t + \delta) \quad (2)$$

where $\delta$ is the phase error between local oscillator signal and the carrier signal. In Equation 1, $f_m(t)$ represents the modulating signal which is assumed to have a zero mean value. Since the detectors develop an output proportional to the product of the inputs, the voltage $V_3$ at the output of the synchronous detector may be represented by the equation $$V_3 = \frac{f_m(t)}{2}\ [\cos\ \delta + \cos\ (2\omega_0 t + \delta)] \quad (3)$$

Similarly, since local oscillator input to detector 2 is shifted 90 degrees in phase with respect to the input of detector 1, it may be represented by the following equation $$V_4 = \sin\ (\omega_0 t + \delta) \quad (4)$$

so that at the output of detector 2 is obtained a voltage $V_5$ represented by the following equation $$V_5 = \frac{f_m(t)}{2}\ [\sin\ \delta + \sin\ (2\omega_0 t + \delta)] \quad (5)$$

Since the double frequency components cos $(2\omega_0 + \delta)$ and sin $(2\omega t + \delta)$ of Equations 3 and 5 will not be passed by the filters 4 and 5, at the output of these filters is obtained respectively voltages $V_6$ and $V_7$ represented by the following equations $$V_6 = \frac{f_m(t)\ \cos\ \delta}{2} \quad (6)$$

$$V_7 = \frac{f_m(t)\ \sin\ \delta}{2} \quad (7)$$

If $\delta$ is zero, voltage $V_7$ will also be zero. Thus, the voltage $V_7$ is indicative of phase error. The error sense, i.e., whether $\delta$ is positive or negative, may be determined at once by comparing the relative polarities of $V_6$ and $V_7$.

One way in which the information in Equations 6 and 7 can be used for phase control of the local oscillator is by means of an audio phase detector, such as detector 8 in FIG. 1, which develops a unidirectional component of voltage having a polarity and magnitude corresponding to the direction of phase error and magnitude thereof, respectively, in addition to alternating components of voltage. The unidirectional component of voltage is obtained at the output of the smoothing filter 9 which removes the aforementioned alternating component of voltage. Thus, the voltage applied to the frequency control unit 10 is a voltage which is zero if no phase error exists and which changes polarity when the phase error changes sign. Accordingly, in the manner described above, a stable feedback control of local oscillator phase is had.

In the embodiment of FIG. 1 described in the preceding paragraphs, a synchronous type detection was utilized for deriving the in-phase and quadrature phase audio components of modulating frequency. The in-phase audio component is that component obtained at the output of detector 1 and the quadrature components refers to that component of audio voltage obtained from the output of detector 2. Other types of detection may be utilized for obtaining these components of audio voltage.

The dotted block *1a* in FIG. 1 in which are included the detectors 1 and 2 and the phase shifter *2a* represents a functional component of the present embodiment which has one input to which the double sideband signal is applied and another input to which a locally generated wave of carrier frequency is applied and from which are obtained at one output an in-phase component of audio modulating voltage and from another output of which is obtained a quadrature phase audio modulating component. The in-phase modulating component may be also obtained by an exalted carrier type of detection in which a locally generated wave of carrier frequency is additively combined with the received signal of substantially smaller amplitude than the locally generated wave and in which the audio modulating component of the received signal is derived by peak detection of the amplitude variation of the combined output. The peak detection function may be performed by any of a variety of peak detection circuits well known in the art. The quadrature phase audio modulating component can be derived by any of a variety of radio frequency phase detectors from the aforementioned combined output. For example, the received signal can be combined with a locally generated wave of carrier frequency and in phase quadrature with respect to the first mentioned locally generated wave. The quadrature phase audio voltage then may be obtained by peak detection of the combined output as in the derivation of the in-phase audio component of modulating voltage.

Referring now to FIG. 2 there is shown one schematic representation of the embodiment shown in block diagram form in FIG. 1. The units of FIG. 2 generally corresponding to the blocks in FIG. 1 are denoted by the same numeral. The detector 1 comprises an electron discharge device 11 having a cathode 12, a grid 13, a screen grid 14, a suppressor grid 15, and an anode 16. The cathode is connected to ground by means of cathode bias resistance 17 by-passed by bypass capacitor 18. The grid is connected to ground through grid leak resistance 19 and also to the output of local oscillator 3 through coupling capacitor 20. The screen grid is connected through screen load resistance 21 to the positive terminal *22a* of a source 22 of unidirectional operating potential, the negative terminal of which is connected to ground. The screen grid 14 is also bypassed to ground through bypass capacitor 23. The anode 16 is connected through anode load resistance 24 to the positive terminal 22*a*. The suppressor grid 15 is connected to the variable tap on voltage divider 27 which, in turn, is connected between terminals 25 and 26, the latter of which is connected to ground. The double sideband signal is applied between terminals 25 and 26. Thus, at the output of detector 1, that is, at the anode 16, is obtained a voltage which is the mathematical product of the double sideband signal and the local oscillator output.

The detector 2 is identical in structure and circuit arrangement to the detector 1. The double sideband signal to be demodulated being applied to suppressor grid 28 of electron discharge device 29 and the signal from local oscillator 3 shifted in phase by 90 degrees being applied to control grid 30. Thus, at the anode 31 of device 29 is obtained a heterodyned output.

The output from the local oscillator 3 is coupled through the coupling capacitor 20 to phase shifter 2*a* which comprises an inductance 32, capacitance 33 connected in series across the output of the local oscillator 3. The inductance and capacitance are arranged to be resonant at the frequency of the local oscillator. Accordingly, the voltage obtained across the capacitor is shifted in phase by 90 degrees with respect to the voltage across the series combination.

Low pass filters 4 and 5 are identical. Filter 4 includes a resistance 34 and capacitance 35 arranged in series between the anode 16 and ground and also includes resistance 36 and capacitance 37 arranged in series across capacitance 35. Coupling capacitor 4*a* isolates the anode 16 from the filter 4 for unidirectional potentials. Similarly, coupling capacitor 5*a* isolates the anode 31 from the filter 5. Output from the filter is derived across capacitance 37. The capacitances 35 and 37 are arranged to have high impedance at the modulating frequencies and low impedance at the frequencies of the carrier frequency thereby eliminating the latter from being applied to the audio amplifier 6. The filters 4 and 5 may also be arranged to have characteristics to eliminate select portions of modulating band of frequencies in which band interfering signals fall.

Audio amplifiers 6 and 7 are identical in circuit arrangement. Audio amplifier 6 comprises electron discharge device 38 including a cathode 39, a grid 40, and a plate 41. The cathode 39 is connected through cathode resistance 42 bypassed by bypass capacitance 43 to ground. The grid is connected through grid leak resistance 44 to ground and also to the ungrounded side of capacitance 37. The anode 41 is connected through anode load resistance 45 to the positive terminal 22*a*. The anode 41 is also connected through coupling capacitor 46 to the grid 47 of the cathode follower stage including electron discharge device 48, which also includes a cathode 49 and an anode 50. The cathode 49 is connected through load resistance 51 to ground. Grid 47 is connected to ground through grid leak resistance 52. Anode 50 is connected to positive terminal 22*a*. The output appearing across resistance 51 is coupled through coupling capacitor 52 across voltage divider 53 connected in shunt with resistance 51. Audio output is obtained between variable tap of potential divider 53 and ground. The output from audio amplifier 6 and also the output from audio amplifier 7 is applied to the audio phase detector 8.

The audio phase detector functions to develop a unidirectional component voltage, the polarity and magnitude of which is dependent upon the relative polarity of the two voltages applied thereto and their relative magnitudes, that is, if one of the voltages is out of phase with respect to the other, a voltage of one polarity is developed while if the one voltage is in phase with respect to the other voltage, a unidirectional component of the voltage of the opposite polarity is developed and also the greater the amplitude of either of these voltages, the greater is the magnitude of unidirectional voltage.

The audio phase detector 8 comprises a transformer 54 and a transformer 62, a diode 68, a diode 69, and a resistance 70. Transformer 54 has a primary winding 55 connected between terminals 56 and 57 and a secondary winding 58 connected between terminals 59 and 60 and including a center tap 61. Transformer 62 has a primary winding 63 connected between terminals 64 and 65 and a secondary winding 66 connected between center tap 61 and terminal 67. Terminal 59 is connected to the plate of diode 68 and terminal 60 is connected to the cathode of diode 69. One end of resistance 70 is connected to terminal 67 and the other end is connected to the cathode of diode 68 and the anode of diode 69. Terminals 57 and 65 are connected to ground and terminals 56 and 64 are connected through coupling capacitors 52 and 52*a* to the output of audio amplifiers 6 and 7, respectively.

The operation of audio phase detector 8 will best be understood by considering several examples. Assume that a voltage is applied between terminals 56 and 57 and that no voltage is applied between terminals 64 and 65. Assume that the phase of the voltage at point 59 with respect to terminal 60 is the same as the voltage at terminal 56 with respect to terminal 57. Accordingly, on positive half cycles the diodes 68 and 69 will both conduct while on the negative half cycles these diodes will be nonconductive. Thus, the voltage at that end of the resistance 70 connected to diodes 68 and 69 will be intermediate in value to the voltage existing between terminals 59 and 60 and the voltage at the other end of resistance 70, that is, at terminal 67, will also be intermediate in potential to the voltage between terminals 59 and 60. Consequently, no current will flow through resistance 70 and the voltage at terminal 67 will be zero with respect to ground.

Now let it be assumed that a voltage is applied between terminals 64 and 65 which is in phase with the voltage between terminals 56 and 57. Let it further be assumed that the potential existing at center tap 61 with respect to 67 also is in phase with the voltage existing at terminal 59 with respect to terminal 60. Let it still further be assumed that the magnitude of voltage 61—67 is less than the 59—60 voltage. Accordingly, the alternating voltage appearing between terminals 59 and 67 is the sum of the in-phase voltages existing between terminals 59 and 61 and terminals 61 and 67. The voltage existing between terminals 60 and 67 is the sum of voltages existing between terminals 60 and 61 and between 61 and 67. Since the voltage of terminal 60 with respect to 61 is out of phase with respect to the voltage existing between terminals 61 and 67, the amplitude of the resultant alternating voltage appearing between terminals 60 and 67 is less than the amplitude of the resultant voltage appearing between terminals 59 and 67. Since the diode 68 conducts on positive half cycles and the diode 69 conducts on negative half cycles, these diodes will conduct simultaneously passing current in opposite directions through the resistance 70. Since the amplitude of the voltage between terminals 59 and 67 is greater than the amplitude of the voltage between terminals 60 and 67, half cycles of voltage will appear across resistance 70 with the terminal connected to ground appearing positive with respect to the other terminal 67. From the foregoing description it is also apparent that the larger the voltage applied to the primary winding 63 of transformer 62, the greater will be the amplitude of these positive half cycles of voltage.

Similarly, it may be shown when the voltage applied to the primary 63 is of the opposite phase with respect to the voltage across primary 55, that half cycles of voltage are caused to appear across the resistance 70 which are of the opposite polarity, i.e., the grounded terminal of resistance 70 is negative with respect to the other terminal of this resistance; and likewise, the greater the amplitude of alternating voltage applied to the primary 63, the greater are the amplitudes of these negative half cycles.

The unidirectional component of voltage appearing across resistance 70 is filtered by the smoothing filter 9 which comprises a resistance 71 and a capacitance 72 connected in series across resistance 70. Thus, across the capacitance 72 appears a unidirectional component of voltage whose polarity and magnitude is a function of the relative phase of the two alternating voltages applied to the audio phase detector and whose amplitude is a function of the relative magnitudes of these two voltages. This unidirectional component of voltage is used to vary the phase of the local oscillator 3 in a manner to be presently described.

The local oscillator 3 comprises an electron discharge device 73 functioning as an amplifier, electron discharge device 74 functioning as a cathode follower buffer stage, a phase shift network 75 and an amplitude control circuit 76. The electron discharge device 73 comprises a cathode 77, a grid 78, and an anode 79. The cathode 77 is connected to ground; the grid 78 is connected through grid leak resistance 80, and diode load resistance 81 to ground. The anode 79 is connected through anode load resistance 82 to the positive terminal 22*a*. The electron discharge device 74 comprises a cathode 83, a grid 84, and an anode 85. The cathode is connected through cathode load resistance 86 to ground. The grid is connected through grid leak resistance 87 to ground and also through biasing resistance 88 to the positive terminal 22*a* and also through coupling capacitor 89 to anode 79.

The phase shift network 75 comprises capacitances 90, 91, 92, and 93 connected in series between the cathode 83 and the grid 78. Resistances 94, 95, and 96 are connected respectively between the successive common terminals of the capacitances of the phase shift network 75 and ground. The amplitude control circuit 76 comprises a diode 97 having a cathode connected to the junction of resistances 98 and 99 which are serially connected between the positive terminal 22*a* and ground, and having an anode 100 connected through resistance 81 bypassed by capacitance 101 to ground. The cathode 83 is also connected to the cathode of device 97 through capacitance 102. The phase shift through phase shift network 75 and through the amplifier device 73 is equal to a complete cycle at a particular frequency of oscillation of the oscillator 3 determined by the values of capacitance and resistance in the phase shift network. It is noted that the phase shift network advances the phase of the voltage appearing at its output with respect to the voltage appearing at its input. It should be noted that the gain of the circuit from the output across resistance 86 through the phase shift network 75, through the amplifier 73 and back to the device 74 is such as to be more than adequate to take care of any circuit losses in this loop; consequently, this circuit will oscillate at some frequency determined by the time constants of the phase shift network 75.

It should be noted that the frequency of oscillation can be varied by varying the phase shift of the phase shift network 75. By increasing the circuit losses in this network, the phase of the wave at the output thereof can be advanced with respect to the phase at its input. Similarly, if the losses are reduced, the phase at the output of this network can be retarded with respect to the phase at its input. The frequency control unit 10 functions to this end.

Frequency control unit 10 comprises a unilaterally conducting device 103 having an anode connected to the junction of capacitances 92 and 93 through current limiting resistance 93*a* and a cathode connected to the ungrounded side of capacitance 72 of the smoothing filter 9. When the voltage at the cathode of device 103 is at ground potential, the diode 103 conducts on positive half cycles thereby introducing a certain amount of power loss in the phase shift network. When the cathode voltage is negative with respect to ground, the diode conducts for a period of time greater than a half cycle thereby introducing greater losses and similarly, when the potential in the cathode is positive with respect to ground, the diode 103 conducts for a period of time less than one half cycle thereby introducing smaller circuit losses in the phase shift network. Consequently, it is seen that the potential at the cathode of device 103 controls the phase shift of phase shift network 75 and thereby controls the frequency of the wave at the output of oscillator 3 which in turn controls the phase at the output of oscillator 3.

The amplitude of the output of oscillator 3 is controlled by the amplitude control network 76. If the amplitude of voltage appearing at the output of cathode follower 74 is greater than the magnitude of bias voltage across resistance 99, the diode 97 conducts developing a unidirectional potential across the resistance 81 with the end thereof connected to the anode 100 negative with respect to ground. The greater the amplitude of the voltage appearing across resistance 86, the greater is this negative voltage appearing across resistance 81. Since the anode 100 is connected through resistance 80 to the grid 78 of the amplifier 73, the latter is biased negatively as the output across the cathode follower 74 increases thereby reducing the gain of amplifier 73 and maintaining the output voltage appearing across resistance 86 substantially constant.

Thus, applicant has shown and described an improved system of receiving amplitude modulation signals. While the invention has been described in connection with a double sideband communication system, the invention is equally effective with conventional amplitude modulation communication systems.

In applicant's system of reception of amplitude modulation signals, the necessary filtering is done at low or audio frequencies; and consequently, can be done with greater precision with consequent improvement in selectivity than can be done in conventional systems in which the necessary filtering is done at radio and intermediate frequencies. With applicant's system of reception adjacent channel interference can be effectively reduced by suitably designed low frequency filters. Interfering signals lying in the same frequency band as the received signals can also be effectively reduced by shifting the phase and amplitude of the output of the quadrature phase channel of the receiving system and then suitably combining the output with the output of the in-phase channel. This is possible since when a locally generated wave is in phase with the carrier, no output of signal frequency is obtained in the quadrature phase channel while interfering signals appear in both channels. The interfering signal appearing in the quadrature channel in general bears some correlation to the interfering signal appearing in the in-phase channel and thus, by suitably shifting the phase and amplitude of the output of the quadrature phase channel, and combining the shifted output of the quadrature phase channel with the output of the in-phase channel interfering signals in the in-phase channel can be effectively reduced.

Prior art systems required complex apparatus for maintaining proper synchronization of the locally generated wave with the suppressed carrier present in the received signal. The complex apparatus involved highly critical radio frequency and audio frequency as well as D.-C. amplifier components. Synchronization in applicant's invention is achieved by a simple circuit arrangement operating substantially at low frequencies. In addition, it should be noted that the prior art systems which depended upon the presence of a small amount of carrier in the received signal for synchronization were subject to carrier capture by spurious carrier waves of larger amplitude than the desired suppressed carrier and thereby seriously impairing the reception of the double sideband signal. Since applicant's synchronization circuit is operative independent of the presence of carrier and functions solely on the double sidebands, this serious disadvantage is eliminated.

While I have shown particular embodiments of the present invention, it will, of course, be understood that I do not wish to be limited thereto since many modifications both in circuit arrangement and in the instrumentalities involved may be made and I, therefore, contemplate by the appended claims to cover any such modifications as fall within the true spirit and scope of my invention.

What I claim as new and desire to secure by Letters Patent of the United States is:

1. In a system of communication in which the sidebands of a resultant wave formed by modulating in amplitude a carrier wave by a modulating wave are transmitted and in which said modulating wave is recovered by heterodyning said transmitted wave with a locally generated wave in phase with said carrier wave and deriving from the heterodyned output said modulating wave, means for maintaining said locally generated wave in phase with said carrier wave comprising means for deriving a wave in phase quadrature to said locally generated wave, means for mixing said phase quadrature wave with said resultant wave, means for deriving from the mixed output a wave repesenting the modulating component of said resultant wave, the amplitude and phase of said modulating component with respect to the amplitude and phase of the modulating component derived by heterodyning said resultant wave with said locally generated wave varying in accordance with the departure in phase of said locally generated wave from the phase of said carrier wave, means for combining said derived modulating components to obtain an output whose polarity and magnitude varies respectively in accordance with the direction and magnitude of the departure of the phase of said locally generated wave with respect to the phase of said carrier wave, means responsive to the polarity of output of said combining means to vary the phase of said locally generated wave in inverse direction to the direction of departure of said carrier wave causing said polarity thereby maintaining said locally generated wave in phase with said carrier wave.

2. A receiver for a double sideband suppressed carrier amplitude modulated wave comprising, a local oscillation wave generator producing a first wave of nominal carrier frequency and phase, means for deriving a second wave in phase quadrature relation with said first wave, first means for combining an input double sideband suppressed carrier amplitude modulation wave with said first wave to produce a first resultant intelligence wave, first filter means for passing signals in the frequency range of the modulating signals of said input wave, means connecting said first resultant intelligence wave to said filter means, second means for combining said input waves with said second wave to produce a second resultant intelligence wave, second filter means for passing signals in the frequency range of said modulating signals, means connecting said second resultant intelligence wave to said second filter means, means for comparing the output of said first and second filter means to produce a control signal when a deviation exists between the frequency or phase of said carrier wave and said wave of nominal carrier frequency and phase, the polarity and magnitude of said control signal being representative of the direction and magnitude respectively of said deviation, means responsive to said control signal for controlling the frequency and phase of oscillation of said local oscillation wave generator in accordance with the polarity and magnitude of said control signal, whereby said oscillation wave generator is synchronized with said carrier wave solely by the utilization of said intelligence signals, and means for obtaining output signals corresponding to said modulating signals from said first filter means.

References Cited in the file of this patent

UNITED STATES PATENTS

| | | |
|---|---|---|
| 1,547,217 | Herman | July 28, 1925 |
| 1,917,395 | Runge | July 11, 1933 |
| 2,063,588 | Crosby | Dec. 8, 1936 |
| 2,623,169 | Gavdeve | Dec. 23, 1952 |
| 2,623,177 | Hugenholtz | Dec. 23, 1952 |
| 2,702,852 | Briggs | Feb. 22, 1955 |
| 2,828,414 | Rieke | Mar. 25, 1958 |

FOREIGN PATENTS

| | | |
|---|---|---|
| 525,854 | Belgium | Feb. 15, 1954 |
| 749,038 | Great Britain | May 16, 1956 |

OTHER REFERENCES

"Practical Single-Sideband Reception," by Norgaard in QST magazine for July 1948, pages 11 to 15.